United States Patent
Sadr et al.

(10) Patent No.: US 9,983,299 B2
(45) Date of Patent: *May 29, 2018

(54) SYSTEMS AND METHODS FOR COMPRESSIVE SENSING RANGING EVALUATION

(71) Applicant: Mojix, Inc., Los Angeles, CA (US)

(72) Inventors: Ramin Sadr, Los Angeles, CA (US); Andreas Mantik Ali, Walnut, CA (US); Andres I. Vila Casado, Los Angeles, CA (US); Christopher Jones, Pacific Palisades, CA (US)

(73) Assignee: Mojix, Inc., Los Angeles, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/796,727

(22) Filed: Jul. 10, 2015

(65) Prior Publication Data
US 2015/0316643 A1 Nov. 5, 2015

Related U.S. Application Data

(63) Continuation of application No. 13/831,938, filed on Mar. 15, 2013.

(51) Int. Cl.
*H04Q 5/22* (2006.01)
*G01S 11/02* (2010.01)
(Continued)

(52) U.S. Cl.
CPC ............ *G01S 11/02* (2013.01); *G01S 13/00* (2013.01); *G01S 13/75* (2013.01);
(Continued)

(58) Field of Classification Search
CPC ......... G01S 11/02; G01S 13/00; G01S 13/75; G01S 2013/0245; G06K 7/10099; G06K 7/10356; G06K 7/10366
See application file for complete search history.

(56) References Cited

U.S. PATENT DOCUMENTS

| 4,595,915 A | 6/1986 | Close et al. |
| 5,126,748 A | 6/1992 | Ames et al. |

(Continued)

FOREIGN PATENT DOCUMENTS

| JP | 05142341 A | 6/1993 |
| JP | 2002098747 A | 4/2002 |

(Continued)

OTHER PUBLICATIONS

International Search Report and Written Opinion for International Application PCT/US2014/029231, report completed Jul. 16, 2014, Mailed Aug. 12, 2014, 10 Pgs.

(Continued)

*Primary Examiner* — Brian Zimmerman
*Assistant Examiner* — Thomas McCormack
(74) *Attorney, Agent, or Firm* — KPPB LLP

(57) ABSTRACT

RFID systems for locating RFID tags utilizing phased array antennas and compressed sensing processing techniques in accordance with embodiments of the invention are disclosed. In one embodiment of the invention, an RFID system includes at least one exciter that includes at least one transmit antenna, a phased antenna array that includes a plurality of receive antennas, and an RFID receiver system configured to communicate with the at least one exciter and connected to the phased antenna array, where the RFID receiver system is configured to locate an RFID tag by performing reads of the RFD tag at multiple frequencies, generating a measurement matrix, and determining a line of sight (LOS) distance between the activated RFID tag and each of the plurality of receive antennas by eliminating bases from the measurement matrix.

22 Claims, 6 Drawing Sheets

(51) Int. Cl.
*G06K 7/10* (2006.01)
*G01S 13/00* (2006.01)
*G01S 13/75* (2006.01)
*G01S 13/02* (2006.01)

(52) U.S. Cl.
CPC ..... *G06K 7/10099* (2013.01); *G06K 7/10356* (2013.01); *G06K 7/10366* (2013.01); *G01S 2013/0245* (2013.01)

(56) References Cited

U.S. PATENT DOCUMENTS

| | | |
|---|---|---|
| 5,227,803 A | 7/1993 | O'Connor et al. |
| 5,365,516 A | 11/1994 | Jandrell |
| 5,602,741 A | 2/1997 | Talbot et al. |
| 5,648,767 A | 7/1997 | O'Connor et al. |
| 5,963,149 A | 10/1999 | Nagura |
| 6,353,406 B1 | 3/2002 | Lanzl et al. |
| 6,574,478 B1 | 6/2003 | Mortensen |
| 6,600,443 B2 | 7/2003 | Landt |
| 6,825,754 B1 | 11/2004 | Rolin |
| 7,009,561 B2 | 3/2006 | Menache et al. |
| 7,024,331 B2 | 4/2006 | Jones et al. |
| 7,119,738 B2 | 10/2006 | Brighelall et al. |
| 7,228,228 B2 | 6/2007 | Bartlett et al. |
| 7,260,369 B2 | 8/2007 | Feher |
| 7,271,765 B2 | 9/2007 | Stilp et al. |
| 7,289,815 B2 | 10/2007 | Gfeller et al. |
| 7,477,193 B2 | 1/2009 | Evers et al. |
| 7,528,776 B2 | 5/2009 | Montuno |
| 7,584,885 B1 | 9/2009 | Douglass |
| 7,592,909 B2 | 9/2009 | Zaruba et al. |
| 7,627,329 B2 | 12/2009 | Mizugaki et al. |
| 7,667,652 B2 | 2/2010 | Gevargiz |
| 7,710,320 B2 | 5/2010 | Fullerton et al. |
| 7,800,541 B2 | 9/2010 | Moshfeghi |
| 7,825,858 B2 | 11/2010 | Blessing et al. |
| 7,917,155 B2 | 3/2011 | Karr et al. |
| 7,973,701 B2 | 7/2011 | Lohmeier et al. |
| 8,072,311 B2 | 11/2011 | Sadr et al. |
| 8,395,482 B2 | 3/2013 | Sadr et al. |
| 8,712,444 B2 | 4/2014 | Dahl et al. |
| 8,830,091 B2 | 9/2014 | Karlsson et al. |
| 9,014,970 B2 | 4/2015 | Oi et al. |
| 9,111,156 B2 | 8/2015 | Sadr et al. |
| 9,291,699 B2 | 3/2016 | Sadr et al. |
| 2002/0024448 A1 | 2/2002 | Olesen |
| 2002/0091666 A1 | 7/2002 | Rice et al. |
| 2004/0058749 A1 | 3/2004 | Pirritano et al. |
| 2004/0263388 A1 | 12/2004 | Krumm et al. |
| 2005/0079871 A1 | 4/2005 | Kirk et al. |
| 2005/0129139 A1 | 6/2005 | Jones et al. |
| 2005/0237953 A1 | 10/2005 | Carrender et al. |
| 2005/0248456 A1 | 11/2005 | Britton et al. |
| 2006/0044147 A1 | 3/2006 | Knox et al. |
| 2006/0208080 A1 | 9/2006 | Overhultz et al. |
| 2006/0224318 A1 | 10/2006 | Wilson et al. |
| 2007/0187266 A1 | 8/2007 | Porter et al. |
| 2007/0219720 A1 | 9/2007 | Trepagnier et al. |
| 2008/0001735 A1 | 1/2008 | Tran |
| 2008/0012710 A1 | 1/2008 | Sadr |
| 2008/0030422 A1 | 2/2008 | Gevargiz et al. |
| 2008/0077361 A1 | 3/2008 | Boyd et al. |
| 2008/0143584 A1 | 6/2008 | Shoarinejad et al. |
| 2008/0258876 A1 | 10/2008 | Overhultz et al. |
| 2009/0146792 A1 | 6/2009 | Sadr et al. |
| 2010/0039228 A1 | 2/2010 | Sadr |
| 2010/0069011 A1 | 3/2010 | Carrick et al. |
| 2010/0241392 A1 | 9/2010 | Jacobs et al. |
| 2011/0153208 A1 | 6/2011 | Kruglick |
| 2011/0181422 A1 | 7/2011 | Tran et al. |
| 2011/0187600 A1 | 8/2011 | Landt |
| 2011/0205358 A1 | 8/2011 | Aota et al. |
| 2012/0086606 A1 | 4/2012 | Mathews et al. |
| 2012/0121161 A1 | 5/2012 | Eade et al. |
| 2012/0139704 A1 | 6/2012 | Sadr et al. |
| 2013/0021294 A1 | 1/2013 | Maharyta et al. |
| 2014/0197926 A1 | 7/2014 | Nikitin |
| 2014/0203914 A1 | 7/2014 | Sadr et al. |
| 2014/0266619 A1 | 9/2014 | Ali et al. |
| 2016/0161590 A1 | 6/2016 | Sadr et al. |
| 2016/0316325 A1 | 10/2016 | Sadr et al. |

FOREIGN PATENT DOCUMENTS

| | | |
|---|---|---|
| JP | 2006284557 A | 10/2006 |
| JP | 2007121014 A | 5/2007 |
| JP | 2007327839 A | 12/2007 |
| WO | 2014144707 A1 | 9/2014 |

OTHER PUBLICATIONS

Bjorninen, Toni, "Advances in Antennas, Design Methods and Analysis Tools for Passive UHF RFID Tags", Jun. 1, 2012 [retrieved on Jul. 16, 2014] Retrieved from the Internet: <URL: https://dspace.cc.tut.fi/dpub/bitstream/handle/123456789/21649/bjominen.pdf?sequence=3>entire document, 53 pgs.

Extended European Search Report for EP Application No. 09763070.1, Completed May 18, 2012, dated May 30, 2012, 10 Pgs.

International Preliminary Report on Patentability for International Application PCT/US2009/040584, completed Nov. 5, 2009, dated Apr. 25, 2011, 8 Pgs.

International Preliminary Report on Patentability for International Application PCT/US2009/040584, dated Oct. 19, 2010, 6 Pgs.

International Search Report for International Application No. PCT/US2009/040584, date completed Jan. 7, 2010, dated Jan. 26, 2010, 4 pgs.

Written Opinion of the International Searching Authority for International Application No. PCT/US2009/040584, date completed Jan. 7, 2010, dated Jan. 26, 2010, 5 pgs.

"Simultaneous Localization and Mapping (SLAM)", Retrieved from https://www.usna.edu/Users/cs/taylor/courses/si475/class/slam.pdf on Nov. 10, 2014, 3 pgs.

Beevers, Kristopher R., "Fixed-lag Sampling Strategies for Particle Filtering SLAM", 2007 IEEE International Conference on Robotics and Automation, Apr. 10-14, 2007, 6 pgs.

Eade, Ethan et al., "Monocular Graph SLAM with Complexity Reduction", 2010 IEEE/RSJ International Conference on Intelligent Robots and Systems Oct. 18-22, 2010, Taipei, Taiwan, pgs. 3017-3024.

Howard, Andrew, "Multi-robot Simultaneous Localization and Mapping using Particle Filters", International Journal of Robotics Research, vol. 25 Issue 12, Dec. 2006, 8 pages.

Huang, Joseph et al., "Efficient, Generalized Indoor WiFi GraphSLAM", IEEE International Conference on Robotics and Automation, Sep. 13, 2010, 6 pgs.

Montemerlo, Michael, "FastSLAM: A Factored Solution to the Simultaneous Localization and Mapping Problem", In Proceedings of the AAAI National Conference on Artificial Intelligence, 2002, 6 pgs.

Slivka, Eric, "Apple Appears to Have Acquired GPS Firm Coherent Navigation [Confirmed]", May 17, 2015, retrieved from http://www.macrumors.com/2015/05/17/apple-coherent-navigation-acquisition/ on May 18, 2015, 16 pgs.

Taniguchi et al., Kentaro, "Indoor Positioning via TDOA measurements Using Particle Filter", IEICE Technical Report, RCS2005-227, vol. 105, No. 623, The Institute of Electronics, Information and Communication Engineers, Feb. 22, 2006, pp. 295-300.

Thrun, Sebastian E., "Multi-Robot SLAM with Sparse Extended Information Filters", Department of Computer Science, Stanford University, Stanford, CA, Department of Physics, Carnegie Mellon University, Pittsburgh, PA, Jul. 29, 2014, 12 pgs.

Candes et al., Emmanuel, "An Introduction to Compressive Sampling", IEEE Signal Processing Magazine, Mar. 2008, pp. 21-30.

SYSTEMS AND METHODS FOR COMPRESSIVE SENSING RANGING EVALUATION

CROSS-REFERENCE TO RELATED APPLICATIONS

This application is a continuation of U.S. patent application Ser. No. 13/831,938 filed Mar. 15, 2013, the disclosure of which is incorporated herein by reference.

FIELD OF THE INVENTION

The present invention relates generally to Radio Frequency Identification (RFID) systems and more specifically to RFID systems utilizing phased array antennas.

BACKGROUND

RFID systems can be used to track, identify, and/or locate items. Such systems conventionally include RFID tags that are affixed to the items, an RFID reader that includes a transmit antenna to send activation signals to the RFID tags and a receive antenna to receive backscattered response signals from the activated tags. As a limitation, many RFID systems require that the RFID reader be within close proximity to the activated RFID tag in order to correctly receive the response signal. The backscattered response signal is more vulnerable to interferences as the distance between the RFID tag and the receive antenna increases. Further, the backscattered response signal may travel multiple paths to the receiver antenna creating multipath distortion.

The theory of compressive sampling, also known as compressed sensing or CS, is a novel sensing/sampling paradigm that allows one to recover signals from far fewer samples or measurements than once thought to be possible. The following overview of CS is largely drawn from Emmanuel J. Candes and Michael B. Wakin, *An Introduction to Compressive Sampling*, IEEE Signal Processing Magazine 21 (March 2008).

CS in practice allows for designing sampling protocols that allow for capturing less data while still maintaining the ability to reconstruct the signal of interest. The two fundamental requirements for CS protocols are that (1) the signals of interest must be "sparse" and (2) the sensing modality must have a sufficient degree of "incoherence".

By way of background, sparsity expresses the idea that the "information rate" of a continuous time signal may be much smaller than suggested by its bandwidth, or that a discrete-time signal depends on a number of degrees of freedom, which is comparably much smaller than its (finite) length. More precisely, CS exploits the fact that many natural signals are sparse or compressible in the sense that they have concise representations when expressed in an appropriate basis.

Incoherence extends the duality between time and frequency and expresses the idea that objects have a sparse representation in one domain can be spread out in the domain in which they are acquired, just as a Dirac or spike in the time domain is spread out in the frequency domain. Put differently, incoherence says that unlike the signal of interest, the sampling/sensing waveforms are capable of having an extremely dense representation in an appropriate domain.

Sparsity

Systems that perform CS typically are faced with the problem in which information about a signal f(t) is obtained by linear functionals recording the values:

$$y_k = \langle f, \varphi_k \rangle$$

In a standard configuration, the objects that the system acquires are correlated with the waveform $\varphi_k$ (t). If the sensing waveforms are Dirac delta functions (spikes), for example, then y is a vector of sampled values of f in the time or space domain. If the sensing waveforms are sinusoids, then y is a vector of Fourier coefficients; this is the sensing modality used in magnetic resonance imaging MRI.

Systems can apply CS to recover information in under-sampled situations. Undersampling refers to a circumstance in which the number M of available measurements is much smaller than the dimension N of the signal f. In such situations, a CS protocol is tasked with solving an under-determined linear system of equations. Letting A denote the M×N sensing or measurement matrix with the vectors $\varphi^*_1, \ldots, \varphi^*_M$ as rows (a* is the complex transpose of a), the process of recovering $f \in \mathbb{R}^N$ from $y = Af \in \mathbb{R}^M$ is ill-posed in general when M<N: there are infinitely many candidate signals for f. Shannon's theory indicates that, if f(t) has low bandwidth, then a small number of (uniform) samples will suffice for recovery. Using CS, signal recovery can actually be made possible using a broader class of signals.

Many natural signals have concise representations when expressed in a convenient basis. Mathematically speaking, a vector $f \in \mathbb{R}^N$ can be expanded in an orthonormal basis $\Psi = [\psi_1 \psi_2 \ldots \psi_N]$ as follows:

$$f(t) = \sum_{i=0}^{N} x_i \psi_i(t)$$

where x is the coefficient sequence of f, $x_i = \langle f, \psi_k \rangle$.

It can be convenient to express f as $\Psi$ (where $\Psi$ is the N×N matrix with $\psi_1, \ldots, \psi_n$ as columns). The implication of sparsity is now clear: when a signal is a sparse expansion, the small coefficients can be discarded without much perceptual loss. Formally, consider $f_s$ (t) obtained by keeping only the terms corresponding to the S largest values of $(x_i)$. By definition $f_s := \Psi x_s$, where $x_s$ is the vector of coefficients $(x_i)$ with all but the largest S set to zero. This vector is sparse in a strict sense since all but a few of its entries are zero. Since $\Psi$ is an orthonormal basis, $\|f - f_S\| = \|x - x_S\|_{\ell_2}$, and if x is sparse or compressible in the sense that the sorted magnitudes of the $(x_i)$ decay quickly, then x is well approximated by $x_s$ and, therefore, the error $\|f - f_s\|_{\ell_2}$ is small. In plain terms, one can "throw away" a large fraction of the coefficients without much loss. As can be appreciated, sparsity is a fundamental modeling tool which permits efficient fundamental signal processing; e.g., accurate statistical estimation and classification, efficient data compression, etc. Sparsity has more surprising and far-reaching implications, however, which is that sparsity has significant bearing on the acquisition process itself. Sparsity determines how efficiently one can acquire signals nonadaptively.

Incoherent Sampling

Consider a pair $(\Phi, \Psi)$ of orthonormal bases or orthobases of $\mathbb{R}^N$. The first basis $\Phi$ is used for sensing the object f and the second $\Psi$ is used to represent f. The coherence between the sensing basis $\Phi$ and the representation basis $\Psi$ is $$\mu(\Phi, \Psi) = \sqrt{N} \max_{1 \leq k, j \leq N} |\langle \varphi_k, \psi_j \rangle|$$

In plain English, coherence measures the largest correlation between any two elements of Φ and Ψ. If Φ and Ψ contain correlated elements, the coherence is large. Otherwise, it is small. As for how large and how small, it follows from linear algebra that $\mu(\Phi, \Psi) \in [1, \sqrt{N}]$.

Compressive sampling is mainly concerned with low coherence pairs of bases. Such bases include the time frequency pair where Φ is the canonical or spike basis and Ψ is the Fourier basis, and wavelet bases for Ψ and noiselet basis for Φ. Random matrices are largely incoherent with any fixed basis Ψ. Select an orthobasis Φ uniformly at random, then with high probability, the coherence between Φ and Ψ is about $\sqrt{(2 \log N)}$. In terms of hardware cost and complexity, it is desirable if the signal basis, Ψ, does not need to be known a priori in order to determine a viable sensing matrix Φ. Fortunately, random sensing matrices with sufficient sample size exhibit low coherence with any fixed basis. This means that a random sensing matrix can acquire sufficient measurements to enable signal reconstruction of a sparse signal without knowing a priori the proper basis Ψ for the signal.

Undersampling and Sparse Signal Recovery

Ideally, the N coefficients of f are observed, but in reality a CS system can only observe a subset of these and collect the data $$y_k = \langle f, \Phi_k \rangle, k \in M$$

where M∈[1, . . . , n] is a subset of cardinality M<N.

With this information, a conventional approach is to recover the signal by $l_1$-norm minimization. Essentially, for all objects consistent with the data, find the object with the coefficient sequence that minimizes the $l_1$-norm. The use of the $l_1$-norm as a sparsity-promoting function traces back several decades. A leading early application was reflection seismology, in which a sparse reflection function (indicating meaningful changes between subsurface layers) was sought from bandlimited data. However $l_1$-norm minimization is not the only way to recover sparse solutions; other methods, such as greedy algorithms, or Orthogonal Matching Pursuit can also be utilized.

In view of the above, CS suggests a very concrete acquisition protocol: sample nonadaptively in an incoherent domain and invoke linear programming after the acquisition step. Following this protocol enables the acquisition of a signal in a compressed form. A decoder can then "decompress" this data.

SUMMARY OF THE INVENTION

RFID systems for locating RFID tags utilizing phased array antennas and compressed sensing processing techniques in accordance with embodiments of the invention are disclosed. In one embodiment of the invention, an RFID system includes at least one exciter that includes at least one transmit antenna configured to transmit an activation signal to activate an RFID tag; a phased antenna array that includes a plurality of receive antennas configured to receive a backscattered response signal from the activated RFID tag; and an RFID receiver system configured to communicate with the at least one exciter and connected to the phased antenna array, where the RFID receiver system is configured to locate an RFID tag by performing reads of the RFID tag at multiple frequencies using the at least one exciter and the plurality of receive antennas of the phased antenna array, generating a measurement matrix for each of the plurality of receive antennas using the phase of the backscattered response signals from the activated RFID tag at each of the multiple frequencies, and determining a line of sight (LOS) distance between the activated RFID tag and each of the plurality of receive antennas by eliminating bases from the measurement matrix.

In a further embodiment, the RFID system of claim 1, where performing reads of the RFID tag at multiple frequencies also includes selecting a new transmit carrier frequency for the activation signal and instructing the at least one exciter to send the activation signal at the new transmit carrier frequency.

In another embodiment, the RFID system of claim 2, where performing reads of the RFID tag at multiple frequencies also includes receiving the backscattered response signal from the activated RFID tag using each of the plurality of receive antennas of the phased antenna array and measuring at least a phase associated with the received backscattered response signal.

In a still further embodiment, the RFID system of claim 3, where generating a measurement matrix also includes selecting a basis function representing the distance travelled from the exciter to the RFID tag to each of the plurality of receive antennas of the phased antenna array.

In still another embodiment, the RFID system of claim 1, where eliminating bases from the measurement matrix also includes deconvolving the measurement matrix; sequentially eliminating a basis from the basis function corresponding to distance outward from the RFID receiver system; calculating and minimizing error after elimination of each successive basis; and determining if the calculated error is greater than a threshold value.

In a yet further embodiment, the RFID system of claim 5, where the threshold value can be determined using a stopping rule.

In yet another embodiment, the RFID system of claim 6, where sequentially eliminating a basis also includes eliminating the shortest remaining basis by a predetermined distance each time.

In a further embodiment again, the RFID system of claim 7, where calculating and minimizing error after elimination of each successive basis also includes forcing a convex optimization process to fit with the remaining basis.

In another embodiment again, the RFID system of claim 1, where eliminating bases from the measurement matrix also includes placing an upper limit on the estimate of the line of sight distance.

In a further additional embodiment, the RFID system of claim 1, where the RFID receiver system is also configured to locate an RFID tag by defining a plurality of elliptical representations using the at least one exciter, the RFID tag, and each of the plurality of receive antennas of the phased antenna array.

In another additional embodiment, the RFID system of claim 10, where the RFID receiver system is also configured to locate an RFID tag using the determined line of sight distance and the plurality of elliptical representations to locate the RFID tag as the intersection of a first ellipse and a second ellipse.

DETAILED DESCRIPTION

Figure 1:
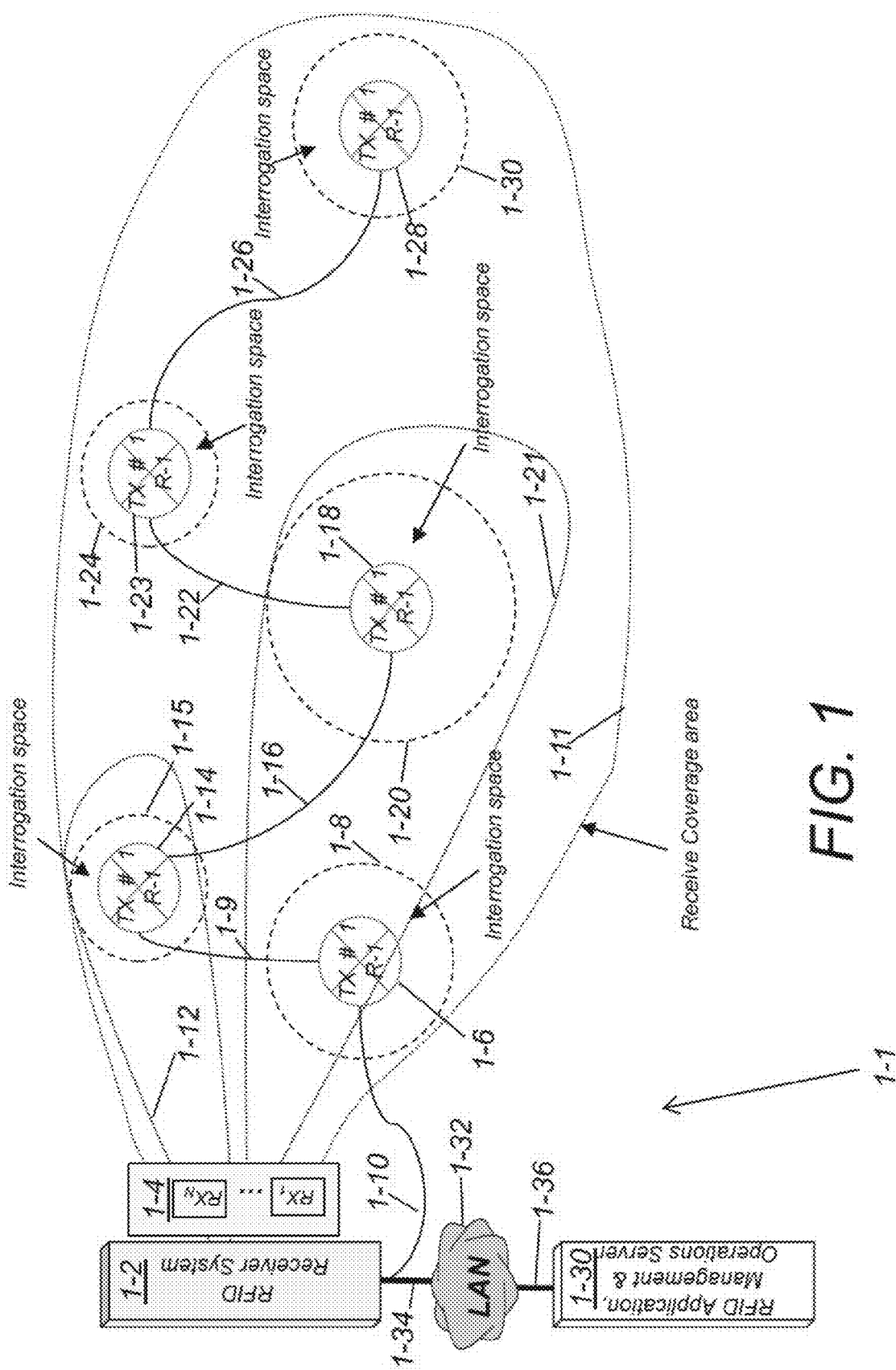
FIG. 1 is a schematic diagram of a distributed exciter architecture showing transmit and receive coverage areas and exciter interrogation spaces for an RFID system in accordance with an embodiment of the invention.

Referring now to the drawings, systems and methods for locating radio frequency identification (RFID) tags utilizing phased array antennas and compressed sensing (CS) processing techniques are described. The systems and methods utilize group delay measurements and CS techniques to reduce the effects of multipath distortion on backscattered response signals received at the RFID receiver. The systems include estimating the line of sight (LOS) distance between RFID tags and RFID receivers by creating a measurement matrix and selecting appropriate basis functions to eliminate multipath distortion. By successively eliminating a basis and observing the effects on error calculations, the system is able to accurately determine the LOS distance from the RFID receiver to the RFID tag. The LOS distance is determined for each receive antenna of a phased antenna array and the RFID tag is located using the system and method described in U.S. Pat. No. 8,082,311 entitled "Radio Frequency Identification Tag Location Estimation and Tracking System and Method", issued Dec. 6, 2011, the disclosure of which is incorporated by reference herein in its entirety.

A variety of RFID reader configurations can be used in accordance with embodiments of the invention including, but not limited to, configurations in which the transmit and receive functions of the reader are decoupled and can be performed by separate exciters and RFID receivers as described in U.S. patent application Ser. No. 12/054,331, filed Mar. 23, 2007 and allowed Oct. 5, 2012, entitled "RFID Systems Using Distributed Exciter Network", the disclosure of which is incorporated by reference as if set forth in full herein.

Distributed Architecture

An RFID system including a distributed exciter architecture in accordance with an embodiment of the invention is shown in FIG. 1. The RFID system (1-1) includes an RFID receiver system (1-2) connected to a phased antenna array (1-4) and a plurality of exciters (1-6, 1-14, 1-18, 1-23, 1-28) that are daisy chained to the RFID receiver system via cables (1-10, 1-9, 1-16, 1-22, 1-26). The RFID receiver system (1-2) is also connected to a LAN (1-32) via connection (1-34). An RFID application server (1-30) is connected to the LAN via connection (1-36). Although the plurality of exciters are shown as wired, in many embodiments exciters communicate wirelessly with the RFID receiver system.

In operation, the RFID receiver system (1-2) controls the activation of exciters. The cable segments (1-10, 1-9, 1-16, 1-22, 1-26) carry both direct current (DC) power and control commands from the RFID receiver system (1-2) to each exciter. The transmitted "backhaul signal" from the RFID receiver system (1-2) to the exciters embeds signal characteristics and parameters that can be used to generate a desired waveform output from the exciter module to an RFID tag. In several embodiments, each exciter can be commanded and addressed by an N-bit address, N-ranging from 16-to-32 bit. The exciters (1-6, 1-14, 1-18, 1-23, 1-28) can be operated sequentially or concurrently, depending on the number of possible beams the RFID receiver system can support. In the illustrated embodiment, the RFID receiver system (1-2) includes a single phased antenna array (1-4) and is capable of generating a single beam. In other embodiments, the RFID receiver system includes multiple antenna arrays and is capable of generating multiple beams.

The interrogation space and transmitted power of each exciter can be managed and controlled by the RFID receiver system (1-2). In the illustrated embodiment, the RFID receiver system (1-2) controls the exciters to create interrogation space (1-8, 1-15, 1-20, 1-24, 1-29) of different sizes. In addition, the received coverage area is configurable. The RFID receiver system can receive signals from the complete coverage area (1-11). Alternatively, the RFID receiver system can adaptively beam-form to the specified exciter interrogation spaces (1-12,1-21).

The RFID application server (1-30) schedules each exciter to operate harmoniously in multiple dimensions, which are time, frequency and space. In a number of embodiments, the RFID application server (1-30) includes a scheduler for S/T/FDM (Space, Time and Frequency Division Multiplexing), which utilizes an optimization algorithm to maximize the probability of successful manipulation of all the RFID tags within a target interrogation space. In addition, the controller may utilize frequency hopping in scheduling the frequency channel for each exciter in order to satisfy various regulatory constraints. Although specific RFID systems including a distributed architecture are discussed above with respect to FIG. 2, any of a variety of RFID system architectures as appropriate to the requirements of a specific application can be utilized in accordance with embodiments of the invention. Processes for determining RFID tag locations using elliptical representation are discussed below.

RFID Tag Location Using Elliptical Representation

In several embodiments of the invention, the RFID system observes a backscattered response signal from activated RFID tags including the signal's phase information. Phase differences observed at various transmit frequencies can provide range information. The ratio of phase difference to frequency difference, referred to as group delay, can provide estimates of the path length between exciters, RFID tags and receive antennas. Using the path lengths and known relative distances between exciters and RFID receivers, an elliptical representation can be utilized to locate RFID tags.

Figure 2:
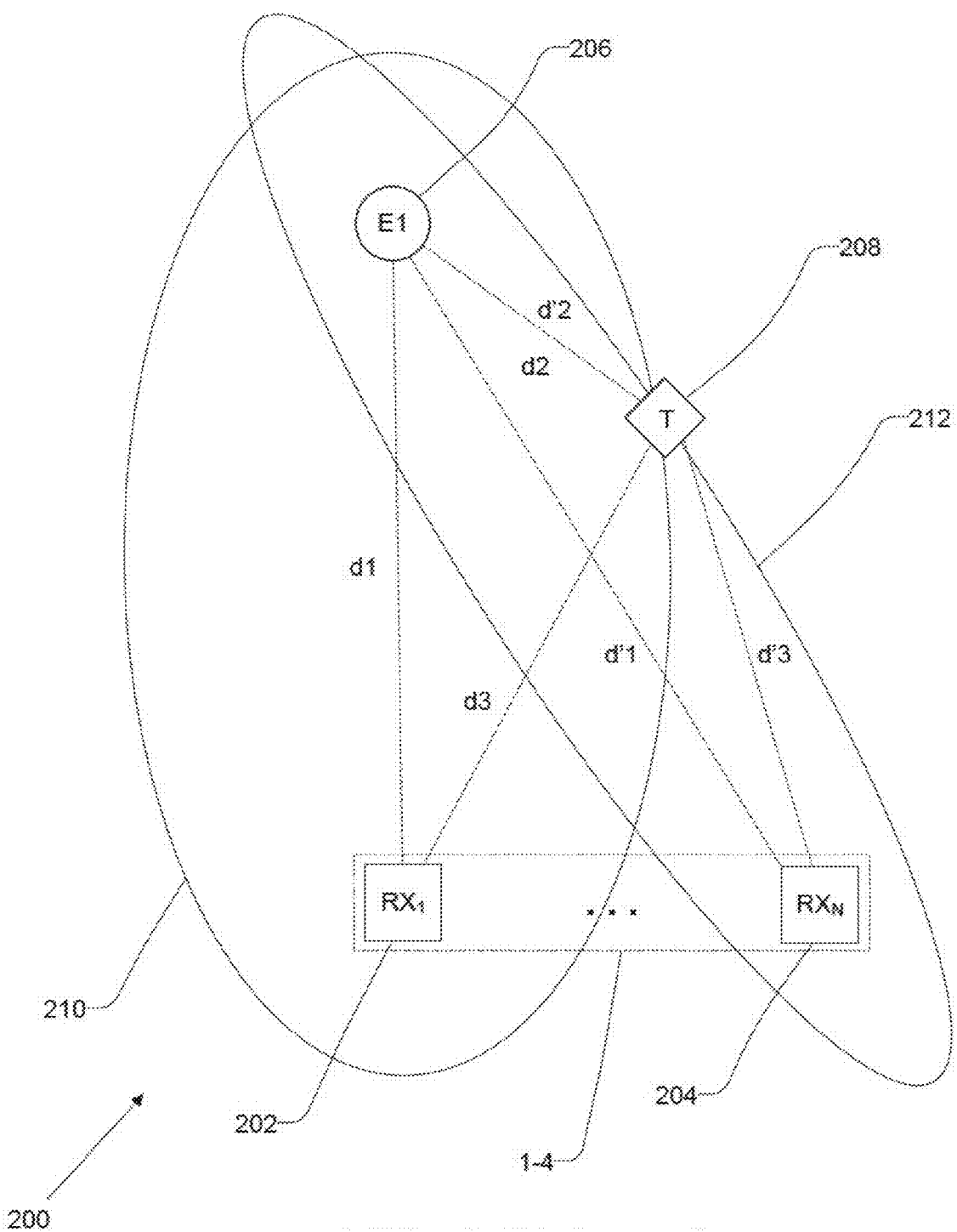
FIG. 2 illustrates an RFID system utilizing elliptical representations for determining the location of an RFID tag in accordance with the prior art.

An RFID system utilizing elliptical representations for determining the location of an RFID tag using a receiver antenna array in accordance with the prior art is shown in FIG. 2. The RFID system (200) includes an RFID receiver antenna array (1-4) with a first receive antenna $RX_1$ (202) and N-1 additional antennas such that the last antenna is $RX_N$ (204). The ellipse (210) is formed using exciter (206) and $RX_1$ (202) as the focus points. The ellipse (212) is formed using exciter (206) and $RX_N$ (204) as the focus points. Additional ellipses are formed using the exciter (206) and the additional N-1 receive antennas of the antenna array (1-4).

The location of an RFID tag (208) is also shown. The exciter is configured to transmit interrogation signals and the receive antennas are configured to receive signals backscattered by the RFID tag. Each receive antenna is a known distance from the exciter, for example $RX_1$ (202) and $RX_N$ (204) are spaced a distance d1 and d'1, respectively relative to the exciter (206). Path length from the exciter to tag to receiver, also known as the ETR distance, can be represented as the distance d2+d3 to receive antenna $RX_1$ (202) and d'2+d'3 to receive antennas $RX_N$ (204). The ETR distance can be determined using group delay observations and the systems and methods described in U.S. Pat. No. 8,082,311 entitled "Radio Frequency Identification Tag Location Estimation and Tracking System and Method", issued Dec. 6, 2011, incorporated by reference above. Accordingly, the ETR distances can be used with a priori known receive antenna and exciter locations to create elliptical representations such that the RFID system can locate RFID tags. In many embodiments of the invention, the RFID tag (208) is located as the intersection of a first ellipse (210) and a second ellipse (212). The method of locating RFID tags utilizing group delay observations and elliptical representation becomes more accurate with additional receive antennas utilized. However, interferences can negatively affect locating RFID tags as further discussed below.

Figure 3:
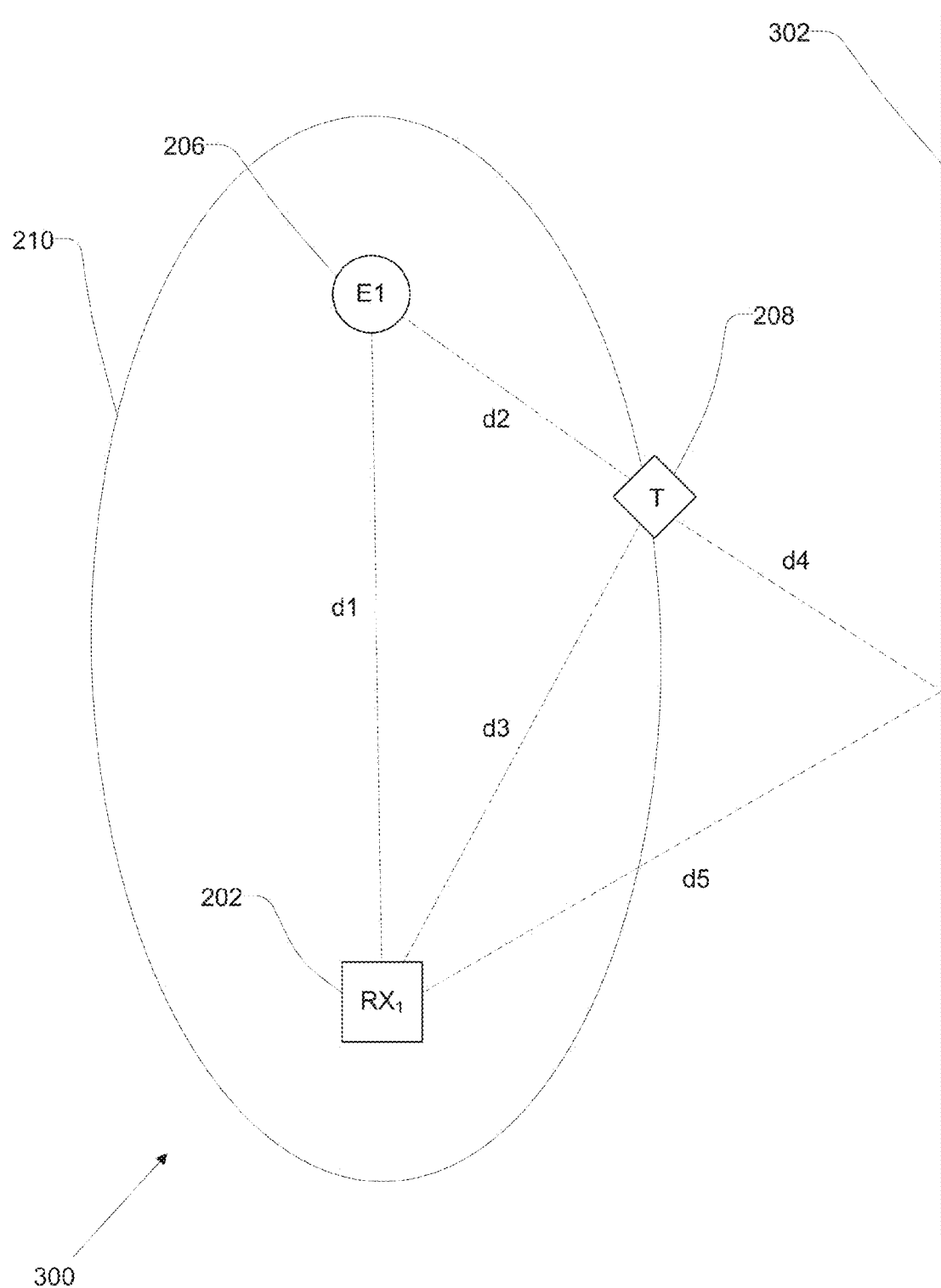
FIG. 3 illustrates an exciter, RFID tag, and RFID receiver and a multipath propagation of a backscattered response signal from an activated RFID tag to the RFID receiver in accordance with an embodiment of the invention.

The backscattered response signal of an activated RFID tag can take multiple paths to reach the RFID receiver. The receive antenna cannot decipher how many paths, if any, a backscattered response signal has traveled and thus leads to so called multipath distortion. An illustration of multipath distortion in accordance with an embodiment of the invention is shown in FIG. 3. The backscattered response signal bounces off obstacle (302) in route to the receive antenna $RX_1$ (202) and thus travels via two paths, d3 and d4+d5. As discussed above, the additional paths negatively impact correctly determining the LOS distance between RFID tag and RFID receiver. Although not illustrated in FIG. 3, there can be more than one obstacle and thus increased multipath distortion.

Although specific process for determining the location of an RFID tag using elliptical representation utilizing a phased antenna array are discussed above with respect to FIG. 2, any of a variety RFID receiver antenna array configurations as appropriate for specific applications can be utilized in accordance with embodiments of the invention. Processes for locating RFID tags utilizing compressed sensing techniques in accordance with embodiments of the invention are discussed further below.

Locating RFID Tags Utilizing CS Techniques

In a compressed sensing approach, the signal received at each receive antenna is assumed to be a sum of the multipath with different distances and phases. In several embodiments of the invention, the received signal wave is deconvolved to express the received signal as the sum of n different distances that the backscattered signal travelled through such that:

$$y = \sum_{i=0}^{n} \alpha_i e^{jf+k}$$

for each of the transmit frequencies.

In several embodiments of the invention, the RFID system measures phase of a received signal at 50 frequency channels (the number of channels allowed in the United States that are open for RFID air communications), where more channels increase sparsity. The CS technique calls for selecting as few basis vectors as possible that still satisfy a given constraint. Knowing a priori that the signal of interest lies in the LOS path, many embodiments of the invention use a successive initial basis elimination (SIBE) approach to give an upper bound on the positive error. In various embodiments, error statistics can be computed via Monte-Carlo simulations and tabulated for the first and second moments for several noise figures.

Figure 4:
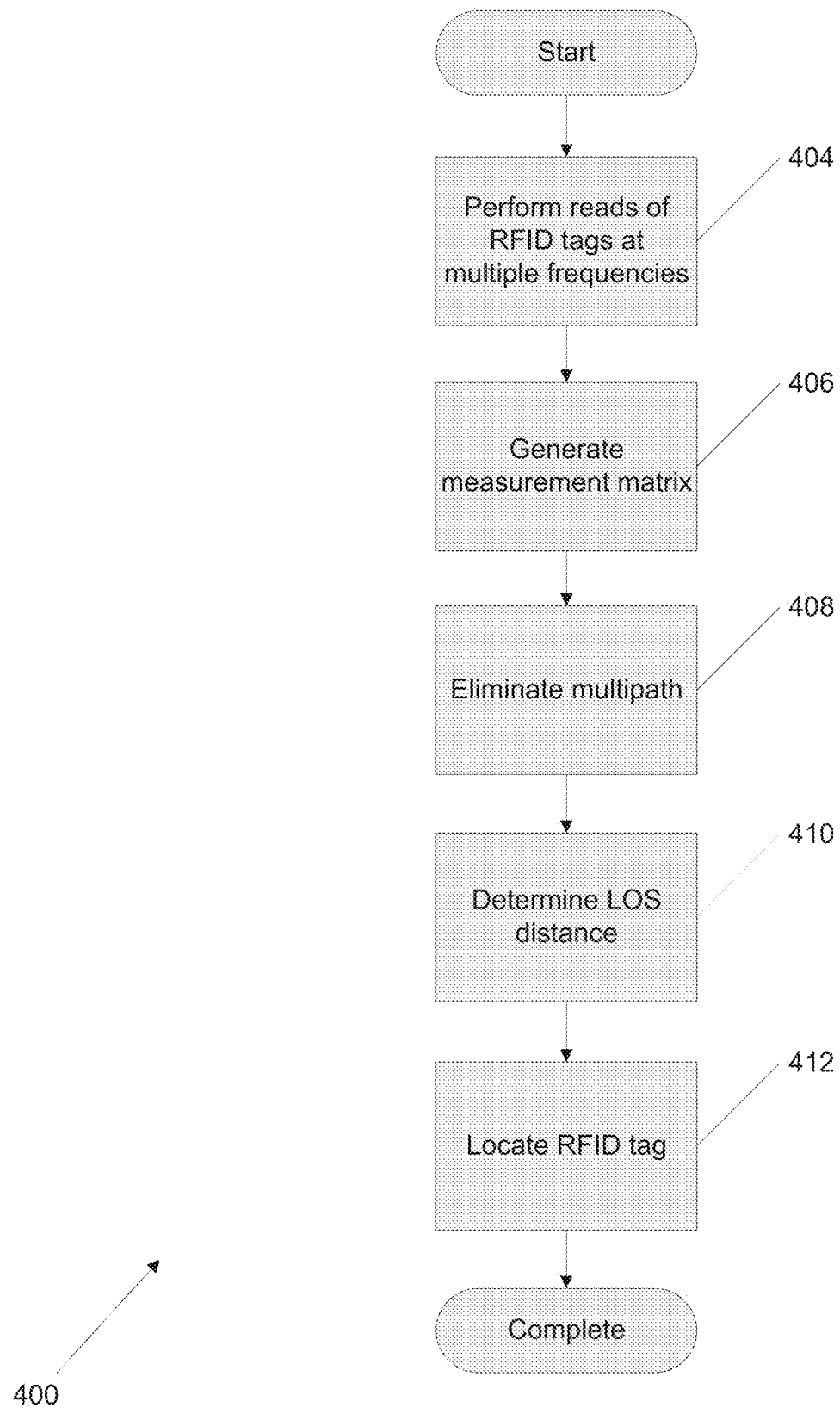
FIG. 4 is a flow chart illustrating a process for locating RFID tags utilizing CS techniques in accordance with an embodiment of the invention.

A process for locating RFID tags utilizing CS techniques in accordance with an embodiment of the invention is shown in FIG. 4. The process (400) includes performing (404) reads of RFID tags at multiple frequencies as discussed further below. Using the backscattered response signals, a measurement matrix is generated (406). The process (400) includes reducing (408) multipath effects and locating (410) the LOS distance. In a number of embodiments, multipath effects are reduced by using a successive initial basis elimination (SIBE) approach, which is discussed further below. Although, in other embodiments any of a variety of processes can be used to eliminate bases from the bases used to construct the measurement matrix to determine the LOS distance as appropriate to the requirements of specific applications. Using the LOS distance, the RFID tag can be located (412). Although specific processes for locating RFID tags utilizing CS techniques are discussed above with respect to FIG. 4, any of a variety of processes for locating RFID tags utilizing CS techniques as appropriate to the requirements of a specific application can be utilized in accordance with embodiments of the invention. Processes for performing RFID tags reads using multiple transmit frequencies are discussed further below.

Performing RFID Tag Reads at Multiple Transmit Frequencies

Figure 5:
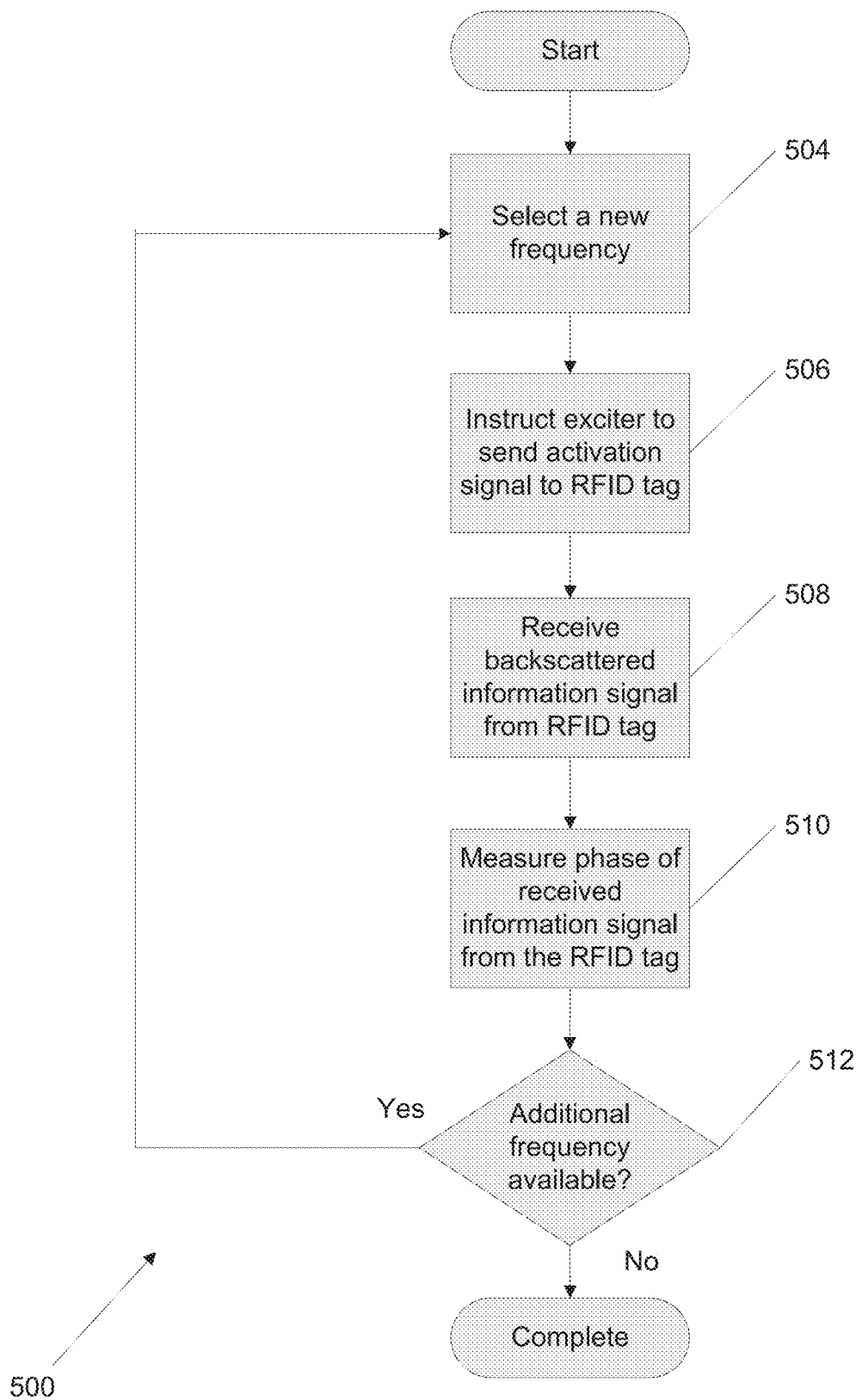
FIG. 5 is a flow chart illustrating a process for activating RFID tags using multiple transmit frequencies in accordance with an embodiment of the invention.

In several embodiments of the invention, the exciter transmits activation signals to the RFID tag using multiple frequencies. A process for performing reads of RFID tags using multiple transmit frequencies in accordance with an embodiment of the invention is shown in FIG. 5. The process (500) includes selecting (504) a new transmit frequency and instructing (506) the exciter to send an activation signal to the RFID tag. The RFID receiver receives (508) the backscattered information signal from the activated RFID tag. The process further includes measuring (510) the phase of the received information signal. If an additional frequency is available then process (500) is repeated from step (504). If no additional frequency is available then process (500) is complete. Although specific processes for performing reads of RFID tags with multiple transmit frequencies are discussed above with respect to FIG. 5, any of a variety of processes for performing reads of RFID tags using multiple transmit frequencies as appropriate to the requirements of a specific application can be utilized in accordance with embodiments of the invention. Processes for eliminating multipath effects using a successive initial basis elimination approach are discussed further below.

Eliminating Multipath Distortion

CS techniques can be utilized to eliminate multipath distortion and determine the LOS distance. A successive initial basis elimination (SIBE) approach is posed by minimizing the following expression:

$$(1-\gamma)\|Ax-b\|_1 + \gamma\|x\|_1$$

where A is a M_basis×N_frequency matrix consisting of the basis for each frequency, x is a M_basis by 1 complex weight vector, and b is a N_frequency×1 complex vector of beamforming coefficients that are measured from each of the RFID tag reads. The vector b includes the observations from the response signal and L1 norm of Ax−b describes how well the Ax matches the observations. In several embodiments, a L2 norm of Ax−b can be utilized to describe how well the Ax matches the observations. Using a convex optimization process, the system determines the lowest coefficient that contributes the most to the observation and once that coefficient is removed from the observation vector, the error significantly increases. When no noise is present, the shortest (nearest to 0) component of the estimate often corresponds to the true LOS path. The choice of γ within 0.1 to 0.9 does not give significant difference in the simulated multipath. The SIBE approach exploits the LOS by successively eliminating the shortest basis by a predetermined distance away from the RFID receiver each time and hence forcing the convex optimization process to fit with the remaining basis.

Figure 6:
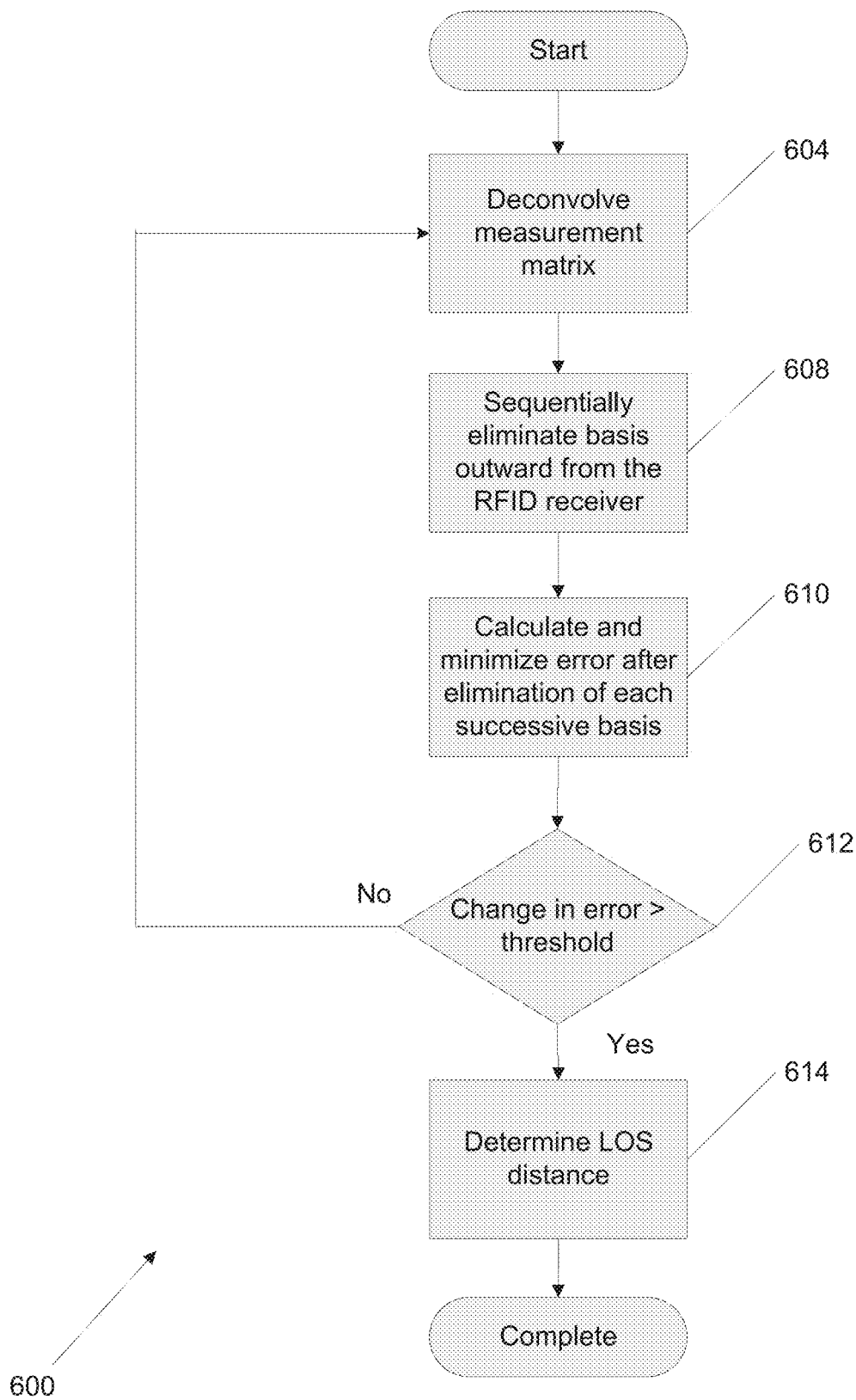
FIG. 6 is a flow chart illustrating a process for eliminating multipath distortion and locating the line of sight (LOS) distance between RFID receivers and RFID tags in accordance with an embodiment of the invention.

A process for eliminating the effects of multipath in determining the LOS distance in accordance with an embodiment of the invention is shown in FIG. 6. The process (600) includes deconvolving (604) the measurement matrix. A basis is sequentially eliminated (608) outward from the RFID receiver. After elimination of each successive basis, the process includes calculating and minimizing (610) error as described below. The change in error is compared (612) to a threshold value. In several embodiments, the threshold value can be determined by a stopping rule that can be predetermine or determined in real-time. If the change in error is not greater than a determined threshold, the process (600) is repeated from step (604). If the change in error is greater than threshold, the LOS is distance is determined (614) as described below. In several embodiments of the invention, the LOS distance is then used to locate the RFID tag utilizing elliptical representation.

Process (600) sequentially eliminates the shortest basis by a predetermined distance each time and generates a misalignment which increases the mean square error (MSE) fit if the true LOS path is eliminated. By detecting the pivot point where significant error occurs by comparing the error to a threshold value, the RFID system can estimate the true LOS distance. Process (600) also puts an upper limit on the estimate since the error significantly increases once the LOS path is removed from the basis. Although specific processes for locating RFID tags by eliminating multipath distortion using CS techniques are discussed above with respect to FIG. 6, any of a variety of processes for locating RFID tags by eliminating multipath distortion using CS techniques as appropriate to the requirements of a specific application can be utilized in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:
1. An RFID system comprising:
at least one exciter comprising at least one transmit antenna configured to transmit an activation signal to activate an RFID tag;
at least one receive antenna configured to receive a backscattered response signal from the activated RFID tag;
an RFID receiver system configured to communicate with the at least one exciter and connected to the at least one receive antenna, the RFID receiver system is configured to identify a line of sight (LOS) distance to an RFID tag by:
performing reads of the RFID tag at multiple frequencies using the at least one exciter and the at least one receive antenna;
generating a measurement matrix for each at least one receive antenna using the phase of the backscattered response signals from the activated RFID tag at each of the multiple frequencies; and
determining the LOS distance between the activated RFID tag and each at least one receive antenna by eliminating bases from the measurement matrix.

2. The RFID system of claim 1, wherein performing reads of the RFID tag at multiple frequencies further comprises:
selecting a new transmit carrier frequency for the activation signal; and
instructing the at least one exciter to send the activation signal at the new transmit carrier frequency.

3. The RFID system of claim 2, wherein performing reads of the RFID tag at multiple frequencies further comprises:
receiving the backscattered response signal from the activated RFID tag using at least one receive antenna; and
measuring at least a phase associated with the received backscattered response signal.

4. The RFID system of claim 3, wherein generating a measurement matrix further comprises selecting a basis function representing the distance travelled from the exciter to the RFID tag to each at least one receive antenna.

5. The RFID system of claim 1, wherein eliminating bases from the measurement matrix further comprises:
deconvolving the measurement matrix;
sequentially eliminating a basis from the basis function corresponding to distance outward from the RFID receiver system;
calculating and minimizing error after elimination of each successive basis; and
determining if the calculated error is greater than a threshold value.

6. The RFID system of claim 5, wherein the threshold value can be determined using a stopping rule.

7. The RFID system of claim 6, wherein sequentially eliminating a basis further comprises eliminating the shortest remaining basis by a predetermined distance each time.

8. The RFID system of claim 7, wherein calculating and minimizing error after elimination of each successive basis further comprises forcing a convex optimization process to fit with the remaining basis.

9. The RFID system of claim 1, wherein eliminating bases from the measurement matrix further comprises placing an upper limit on the estimate of the line of sight distance.

10. The RFID system of claim 1, wherein the RFID receiver system is further configured to locate the RFID tag by defining a plurality of elliptical representations using the at least one exciter, the RFID tag, and each of a plurality of receive antennas, where the plurality of receive antennas are a part of a phased antenna array.

11. The RFID system of claim 10, wherein the RFID receiver system is further configured to locate the RFID tag using the determined line of sight distance and the plurality of elliptical representations to locate the RFID tag as the intersection of a first ellipse and a second ellipse.

12. A method of determining a line of sight distance to an RFID tag comprising:
- activating an RFID tag at multiple frequencies using at least one exciter comprising at least one transmit antenna;
- reading the RFID tag at the multiple frequencies using an RFID receiver comprising at least one receive antenna and an RFID receiver system, the at least one receive antenna configured to receive a backscattered response signal from the activated RFID tag and the RFID receiver system configured to communicate with the at least one exciter and connected to the at least one receive antenna;
- generating a measurement matrix for each at least one receive antenna using the phase of the backscattered response signals from the activated RFID tag at each of the multiple frequencies using the RFID receiver system; and
- determining a line of sight (LOS) distance between the activated RFID tag and each at least one receive antenna by eliminating bases from the measurement matrix using the RFID receiver system.

13. The method of claim 12, wherein activating an RFID tag at multiple frequencies further comprises:
- selecting a new transmit carrier frequency for the activation signal using the RFID receiver system;
- instructing the at least one exciter to send the activation signal at the new transmit carrier frequency using the RFID receiver system; and
- activating the RFID tag using the activation signal at the new transmit carrier frequency using the exciter.

14. The method of claim 13, wherein reading the RFID tag at the multiple frequencies further comprises:
- receiving the backscattered response signal from the activated RFID tag using each at least one receive antenna; and
- measuring at least a phase associated with the received backscattered response signal using the RFID receiver system.

15. The method of claim 14, wherein generating a measurement matrix for each at least one receive antenna further comprises selecting a basis function representing the distance travelled from the exciter to the RFID tag to each at least one receive antenna.

16. The method of claim 12, wherein eliminating bases from the measurement matrix using the RFID receiver system further comprises:
- deconvolving the measurement matrix;
- sequentially eliminating a basis from the basis function corresponding to distance outward from the RFID receiver system;
- calculating and minimizing error after elimination of each successive basis; and
- determining if the calculated error is greater than a threshold value.

17. The method of claim 16, wherein the threshold value can be determined using a stopping rule.

18. The method of claim 17, wherein sequentially eliminating a basis further comprises eliminating the shortest remaining basis by a predetermined distance each time.

19. The method of claim 17, wherein calculating and minimizing error after elimination of each successive basis further comprises forcing a convex optimization process to fit with the remaining basis.

20. The method of claim 13, wherein eliminating bases from the measurement matrix further comprises placing an upper limit on the estimate of the line of sight distance.

21. The method of claim 13, further comprising locating the RFID tag by defining a plurality of elliptical representations using the at least one exciter, the RFID tag, and each of a plurality of receive antennas, where the plurality of receive antennas are a part of a phased antenna array.

22. The method of claim 21, wherein locating the RFID tag further comprises using the determined line of sight distance and the plurality of elliptical representations to locate the RFID tag as the intersection of a first ellipse and a second ellipse.

* * * * *